United States Patent

Maruoka

[11] Patent Number: 5,427,377
[45] Date of Patent: Jun. 27, 1995

[54] RECLAIMED GOLF-BALL AND A PROCESS FOR PRODUCING THE SAME

[75] Inventor: Kiyoto Maruoka, Kobe, Japan

[73] Assignee: Sumitomo Rubber Industries Ltd., Hyogo, Japan

[21] Appl. No.: 911,491

[22] Filed: Jul. 10, 1992

[30] Foreign Application Priority Data

Jul. 15, 1991 [JP] Japan ................. 3-173750
Jun. 9, 1992 [JP] Japan ................. 4-149306

[51] Int. Cl.⁶ .............................................. A63B 37/02
[52] U.S. Cl. ................................. 273/230; 273/218; 29/899; 29/402.06; 29/402.08
[58] Field of Search ............... 273/218, 235 R, 235 A, 273/235 B, 230, 232, 62, 220, 60 R, 60 A, 60 B, 82 R, 63 R, 58 A, 233, 234; 29/899, 899.1, 402.01, 402.06, 402.08, 402.18; 156/94, 98, 153, 146; 264/36; 427/140

[56] References Cited

U.S. PATENT DOCUMENTS

| | | | |
|---|---|---|---|
| 698,517 | 4/1902 | Kempshall | 273/218 |
| 1,531,162 | 3/1925 | Valero | 273/60 A |
| 1,911,569 | 5/1933 | Hinckley | 273/60 R |
| 1,948,292 | 2/1934 | Geer | 273/235 A |
| 2,015,165 | 9/1935 | Twiss et al. | 273/235 A |
| 2,021,042 | 11/1935 | Bayon | 156/94 X |
| 2,079,615 | 5/1937 | Holt et al. | 427/140 |
| 2,090,256 | 8/1937 | Heintz | 264/DIG. 074 |
| 2,105,045 | 1/1938 | Kraft | 273/82 R |
| 2,645,487 | 7/1953 | Hawes | 273/60 R |
| 3,206,828 | 9/1965 | Kikuchi | 29/899 |
| 3,268,634 | 8/1966 | Glaser | 273/235 X |
| 3,419,949 | 1/1969 | Huebner | 29/402.11 X |
| 3,421,766 | 1/1969 | Chmiel et al. | 273/218 |
| 4,256,304 | 3/1981 | Smith et al. | 273/60 B |
| 4,858,924 | 8/1989 | Saito et al. | 273/218 X |
| 4,904,320 | 2/1990 | Isaac et al. | 156/153 X |
| 4,998,734 | 3/1991 | Meyer | 273/235 R |
| 5,018,740 | 5/1991 | Sullivan | 273/218 X |
| 5,049,413 | 9/1991 | Gibson | 427/140 |
| 5,058,892 | 10/1991 | McCloud | 273/128 A |
| 5,096,201 | 3/1992 | Egashira et al. | 273/218 |

FOREIGN PATENT DOCUMENTS 2270277 3/1993 United Kingdom .

*Primary Examiner*—George J. Marlo
*Attorney, Agent, or Firm*—Birch, Stewart, Kolasch & Birch

[57] ABSTRACT

A reclaimed golf ball having approximately the same flying properties (e.g. flying distance, rolling, ballistic height, etc.) as those of a new golf ball, the reclaimed golf ball being obtained by grinding the dimpled surface of a one-piece solid golf ball until the dimples on the surface are substantially removed, and then forming a dimpled coating layer of a rubber or an ionomer resin on the ground exterior surface.

6 Claims, 3 Drawing Sheets

STEP 1    STEP 2    STEP 3

STEP 3

STEP 2

STEP 1

RECLAIMED GOLF-BALL AND A PROCESS FOR PRODUCING THE SAME

BACKGROUND OF THE INVENTION

1. Field of the Invention

The present invention relates to a reclaimed golf ball and more particularly, to a reclaimed golf ball having excellent flying properties and a process for producing the same.

2. Statement of the Related Art

Golf balls, after having been used on driving ranges, are generally disposed of as industrial waste. However, the amount of industrial waste is becoming too large, and it is difficult to dispose of them from the viewpoint of the environment. Therefore, it is desired that used golf balls be reclaimed.

Heretofore, as a method for reclaiming used golf balls, the paint on the surface of the ball was removed, followed by repainting. However, in the used golf ball, dimples on the surface are shallow due to abrasion, etc. Accordingly, the dimples of the reclaimed golf balls which were produced from the used golf ball are also shallow. Golf balls having shallow dimples have a disadvantage that the ball is allowed to blow up or drop after being hit, whereby flying distance is markedly decreased.

SUMMARY OF THE INVENTION

One object of the present invention is to provide a reclaimed golf ball having almost the same flying properties (e.g. flying distance, rolling, ballistic height, etc.) as those of a new golf ball.

Another object of the present invention is to provide a process for producing the above reclaimed golf ball.

These as well as other objects and advantages of the present invention will become apparent to those skilled in the art from the following description.

According to the present invention, there is provided a process for producing a reclaimed golf ball which comprises grinding a one-piece solid golf ball until the dimples on the surface are substantially removed, and covering the ball with a rubber layer or an ionomer resin layer having newly formed dimples on the surface thereof.

BRIEF DESCRIPTION OF THE DRAWINGS

The invention is further described with reference to the accompanying drawing wherein.

DETAILED DESCRIPTION OF THE INVENTION

The process of the present invention can be applied to normal one-piece solid golf balls. The one-piece solid golf ball is generally obtained by vulcanizing a rubber composition containing a base rubber, and a crosslinking agent or the like in a mold. The rubber coating layer may be comprised of several layers.

Figure 1:
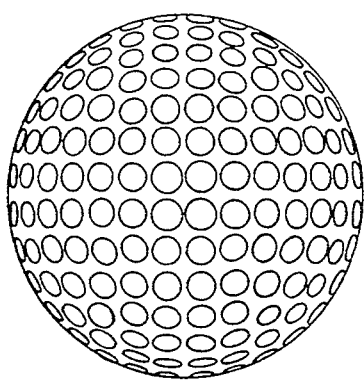
FIG. 1 represents the steps of reclaiming a worn or used golf ball of the present invention with a rubber layer, the golf ball in step 1 showing worn dimples, the golf ball in step 2 showing reduced diameter due to grinding the exterior dimpled surface, and the golf ball in step 3 showing a newly formed dimple layer.
Figure 1:
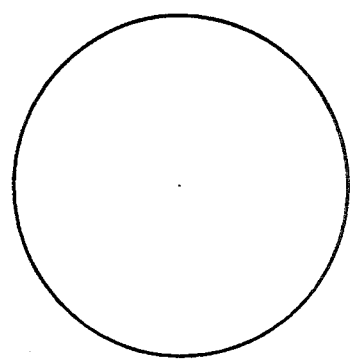
Figure 1:
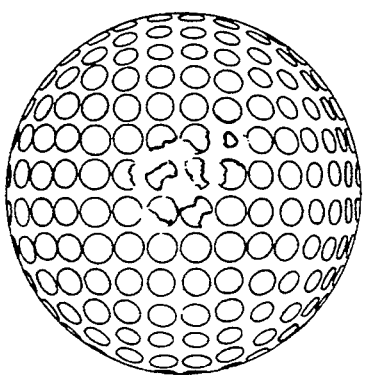

In the present invention, as seen in FIG. 1, the surface of the one-piece worn solid golf ball provided by step 1 is ground until all the dimples are generally removed as shown in step 2, and then covered with a rubber layer or an ionomer resin layer having newly formed dimples on the surface thereof, as seen in step 3. The rubber layer may be formed by covering the ground golf ball with a rubber composition followed by molding and vulcanizing. The ionomer resin layer may be generally formed by injection-molding the ground golf ball with an ionomer resin. It is preferred that the rubber layer or ionomer resin layer be controlled such that the surface hardness of the resulting reclaimed golf ball very nearly equals the surface hardness of the used one-piece solid golf ball which has been ground. It is more preferred that the rubber layer or ionomer resin layer be controlled within a hardness difference of about $\pm 5$, preferably $\pm 2$ according to JIS-K6301. The preferred construction enhances flying properties and also increases hitting durability because of high adhesive properties between the ground golf ball and the covering layer. When the covering layer is a rubber layer, the vulcanization can be conducted in a short period of time by raising the vulcanization temperature or increasing the amount of the free radical group-generating agent, whereby deterioration of the core can be prevented and durability can be improved.

In the process of the present invention, the one-piece solid golf ball is first ground until all the dimples on the surface are substantially removed. The grinding can be further conducted up to about 1 mm from the point the dimples are completely removed. The method of grinding is not specifically limited, but sand paper, whetstone and the like can be used.

When the covering layer is rubber, the ground surface of the golf ball is covered again with a rubber composition. The rubber composition is not specifically limited but at least one sort of a basic rubber, a crosslinking agent and a vulcanization initiator may be formulated therein. Examples of the base rubber include natural rubber, butadiene rubber, isoprene rubber and the like. As the crosslinking agent, for example, there can be used carboxylic acid metal salts formed in the rubber composition (e.g. reactant of methacrylic acid with zinc oxide, reactant of acrylic acid with zinc oxide, etc.). By using the same kind of crosslinking agent, adhesion between the core and cover is improved, whereby durability to striking can be improved. A preferred crosslinking agent is carboxylic acid metal salt (e.g. zinc methacrylate, zinc acrylate, etc.). The formulation may be suitably selected, for example, the amount of unsaturated carboxylic acid such as methacrylic acid, zinc oxide and free group-generating agent, such as dicumyl peroxide, may be 10 to 30 parts by weight 20 to 60% by weight in the case of metal salts), 10 to 70% by weight and 0.5 to 6% by weight (preferably 3 to 6% by weight) based on 100 parts by weight of the base rubber, respectively.

Then, vulcanization is conducted. The vulcanization may be conducted by normal methods. For example, the above rubber composition is charged in a predetermined mold and then normally vulcanized at a temperature of 155° to 175° C., preferably 165° to 175° C. for 5 to 30 minutes, preferably 5 to 15 minutes.

Figure 2:
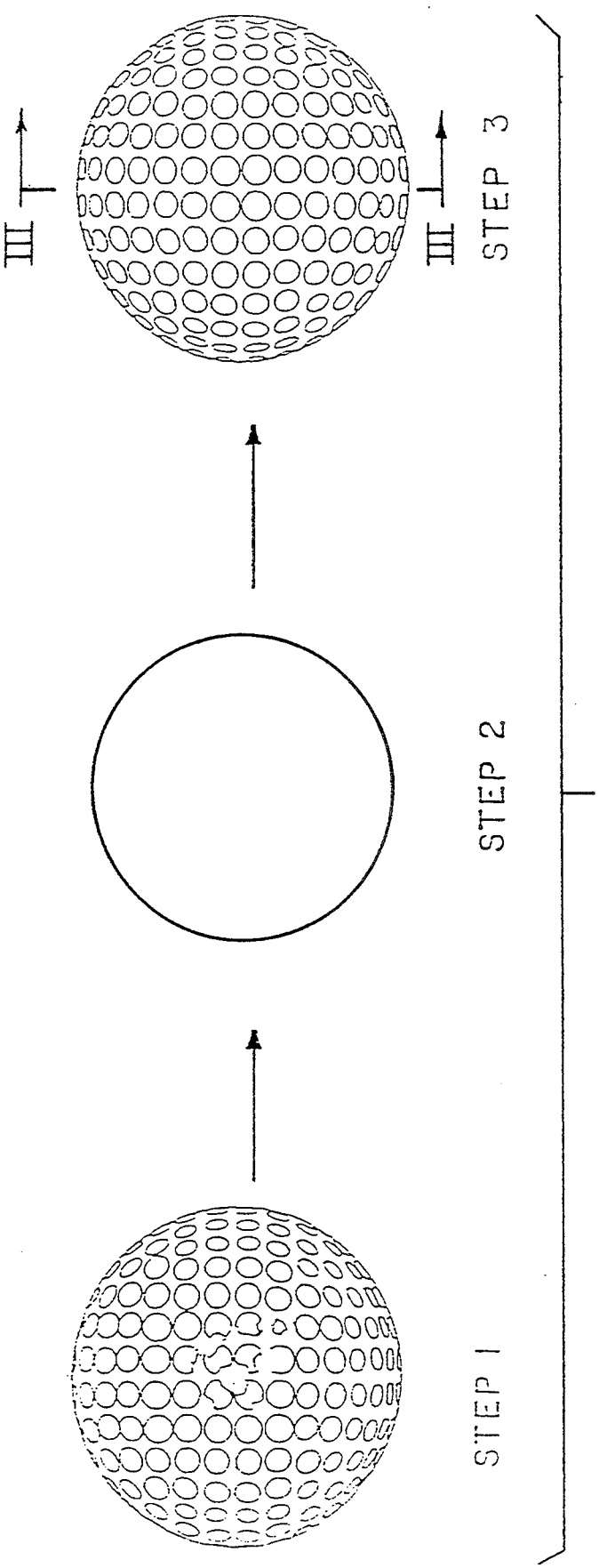
FIG. 2 represents the steps of reclaiming a worn or used golf ball of the present invention with an ionomer resin layer, the golf ball in step 1 showing worn dimples, the golf ball in step 2 showing reduced diameter due to grinding the exterior dimpled surface, and the golf ball in step 3 showing a newly formed dimple layer.
Figure 3:
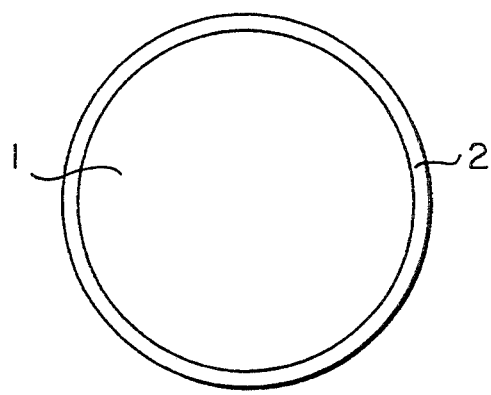
FIG. 3 represents the two-piece golf ball along the section lines III—III of FIG. 2.

When the covering layer is ionomer resin, the ground golf ball is covered with an ionomer resin to form a two-piece solid golf ball. Such a reclaimed golf ball method is shown in FIG. 2 and FIG. 3 where the ground golf ball 1 is covered by an ionomer resin layer 2. Any suitable ionomer resin may be used in the field of golf balls, for example ionomer resins which are available from Shell Chemical Company under the tradename of Surlyn. The ionomer resin may contain other resins (e.g. polyester resin, polyamide resin), pigments, additives and the like, if desired.

The surface of the resulting golf ball is optionally covered with a suitable paint. The paint is not specifically limited, for example, clear dye, enamel dye and the like can be used.

As described above, according to the present invention, there is provided a reclaimed golf ball having almost the same flying properties (e.g. flying distance, rolling, ballistic height, etc.) as those of a new golf ball.

PREFERRED EMBODIMENTS

The following Examples, Comparative Examples and Reference Example further illustrate the present invention in detail but are not to be construed to limit the scope thereof.

Reclaimed golf balls obtained in Examples 1 and 2 and Comparative Examples 1 to 4 and a new golf ball which is virgin are subjected to a flight test. The results are shown in Table 3 below.

EXAMPLES 1 and 2 and COMPARATIVE EXAMPLES 1 and 2

A used golf ball was ground 0.3 mm with a whetstone, covered with a rubber composition of a formulation shown in Table 1 and then vulcanized and molded at the conditions shown in Table 2. Thereafter, the vulcanized ball was painted with an enamel or clear paint to obtain reclaimed golf balls of Examples 1 and 2 and Comparative Examples 1 and 2. The surface hardness of the resulting reclaimed golf balls was measured by means of a hardness tester (JIS-C type) manufactured by Kobunshi Keiki K.K. according to JIS K6301. The results are shown in Table 2.

TABLE 1

| Components | Amount (parts) | |
|---|---|---|
| | Formulation 1 | Formulation 2 |
| High-cis-polybutadiene*[1] | 100 | 100 |
| Zinc oxide | 23.0 | 23.0 |
| Methacrylic acid | 24.0 | 24.0 |
| Dicumyl peroxide | 2.0 | 4.0 |

*[1]Available from Japan Synthetic Rubber Co., Ltd. as BR 11.

TABLE 2

| | Formulation | Vulcanization temp. (°C.) | Vulcanization time (min) | Surface hardness (JIS-C) | |
|---|---|---|---|---|---|
| | | | | Core | ball |
| Example 1 | 1 | 170 | 10 | 76 | 76 |
| Example 2 | 2 | 160 | 10 | 76 | 76 |
| Comp. Example 1 | 1 | 160 | 20 | 76 | 76 |
| Comp. Example 2 | 2 | 170 | 5 | 76 | 82 |

COMPARATIVE EXAMPLES 3 and 4

According to the same manner as that described in Example 1, a used golf ball which is the same type as Example 1 was repainted to obtain a reclaimed golf ball. In Comparative Example 3, a used golf ball which had been used for 2 years was employed. In Comparative Example 4, a used golf ball which had been used for 4 years was employed.

REFERENCE EXAMPLE 1

A virgin golf ball which is the same type as Example 1 was subjected to a flight test as a control.

TABLE 3

| Reclaimed golf ball | Flying distance[1] (yard) | Rolling[2] (yard) | Maximum ballistic height[3] (°) | Depth of dimples[4] | Durability[5] |
|---|---|---|---|---|---|
| Example 1 | 201.7 | 13.9 | 14.7 | 100 | 95 |
| Example 2 | 201.7 | 13.0 | 14.9 | 100 | 97 |
| Comp. Example 1 | 195.0 | 15.9 | 13.1 | 100 | 80 |
| Comp. Example 2 | 205.1 | 15.1 | 15.9 | 100 | 50 |
| Comp. Example 3 | 187.9 | 4.4 | 19.2 | 70 | 80 |
| Comp. Example 4 | 170.1 | 38.5 | 10.0 | 30 | 80 |
| Ref. Example 1 | 202.3 | 12.1 | 14.5 | 100 | 100 |

[1]Flying distance when the ball was stricken to fall down
[2]Rolling distance after the ball was fallen down
[3]Angle formed by the line linking the maximum height point of the golf ball striken and the initial point of it before striking with a horizontal angle
[4]It is indicated by a value based on 100 for Reference Example 1.
[5]Numbers of times when the golf ball was repeatedly striken by means of a swing robot at a head speed of 45 m/second until the ball was broken. It is indicated by a number based on 100 for Reference Example 1.

EXAMPLE 3

A used golf ball was ground 1.0 mm with a whetstone, covered with an ionomer resin by injection molding to obtain a two piece solid golf. The ionomer resin is a mixture of Surlyn 1707, Surlyn 1706 and $TiO_2$ (50/50/20).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A process for reclaiming a golf ball, comprising the steps of:
   (1) providing a one-piece solid golf ball having a worn exterior surface with a plurality of dimples thereon;
   (2) removing said dimpled exterior surface of said solid golf ball by grinding such that substantially all of said plurality of dimples are completely removed; and
   (3) forming a dimpled coating layer directly on said ground exterior surface of said golf ball.

2. The process for reclaiming a golf ball of claim 1, wherein said dimpled coating layer is formed by injection molding of an ionomer resin.

3. The process for reclaiming a golf ball of claim 1, wherein said coating layer comprises rubber.

4. The process for reclaiming a golf ball of claim 3, further comprising the steps of molding and vulcanizing said rubber.

5. The process for reclaiming a golf ball of claim 1, wherein said grinding step is continued up to a depth of about 1 mm below the point said plurality of dimples are completely removed.

6. A reclaimed golf ball produced by the process of claim 1, wherein a surface hardness of said golf ball after forming said dimpled coating layer is within ±5 of a surface hardness of said golf ball after said removal of said dimpled exterior surface, including said plurality of dimples, of said worn golf ball, as measured according to JIS-K6301 hardness.

* * * * *